United States Patent
Büttner et al.

(10) Patent No.: US 11,182,559 B2
(45) Date of Patent: Nov. 23, 2021

(54) SYSTEM AND METHOD FOR NATURAL LANGUAGE PROCESSING

(71) Applicant: Siemens Aktiengesellschaft, Munich (DE)

(72) Inventors: Florian Büttner, Munich (DE); Yatin Chaudhary, Munich (DE); Pankaj Gupta, Munich (DE)

(73) Assignee: SIEMENS AKTIENGESELLSCHAFT

(*) Notice: Subject to any disclaimer, the term of this patent is extended or adjusted under 35 U.S.C. 154(b) by 310 days.

(21) Appl. No.: 16/364,563

(22) Filed: Mar. 26, 2019

(65) Prior Publication Data

US 2020/0311205 A1    Oct. 1, 2020

(51) Int. Cl.
*G06F 40/30* (2020.01)

(52) U.S. Cl.
CPC .................. *G06F 40/30* (2020.01)

(58) Field of Classification Search
CPC .................................................. G06F 40/30
See application file for complete search history.

(56) References Cited

U.S. PATENT DOCUMENTS

2018/0101599 A1* 4/2018 Arnold .............. G06F 40/274
2020/0104369 A1* 4/2020 Bellegarda ......... G06F 40/30

OTHER PUBLICATIONS

Yanming et al., "A Topic BiLSTM Model for Sentiment Classification", Association for Computing Machinery, 2018, whole document (Year: 2018).*

Rajarshi Das, Manzil Zaheer, and Chris Dyer. Gaussian lda for topic models with word embeddings. In Proceedings of the 53rd Annual Meeting of the Association for Computational Linguistics and the 7th International Joint Conference on Natural Language Processing (vol. 1: Long Papers), vol. 1, pp. 795-804, 2015.

(Continued)

*Primary Examiner* — Sonia L Gay
(74) *Attorney, Agent, or Firm* — Schmeiser, Olsen & Watts LLP

(57) ABSTRACT

The invention refers to a natural language processing system configured for receiving an input sequence $c_i$ of input words representing a first sequence of words in a natural language of a first text and generating an output sequence of output words representing a second sequence of words in a natural language of a second text and modeled by a multinominal topic model, wherein the multinominal topic model is extended by an incorporation of full contextual information around each word $v_i$, wherein both preceding words $v_{<i}$ and following words $v_{>i}$ around each word $v_i$ are captured by using a bi-directional language modelling and a feed-forward fashion, wherein position dependent forward hidden layers $\vec{h}_i$ and backward hidden layers $\overleftarrow{h}_i$ for each word $v_i$ are computed.

18 Claims, 4 Drawing Sheets

(56) References Cited

OTHER PUBLICATIONS

Figure 1:
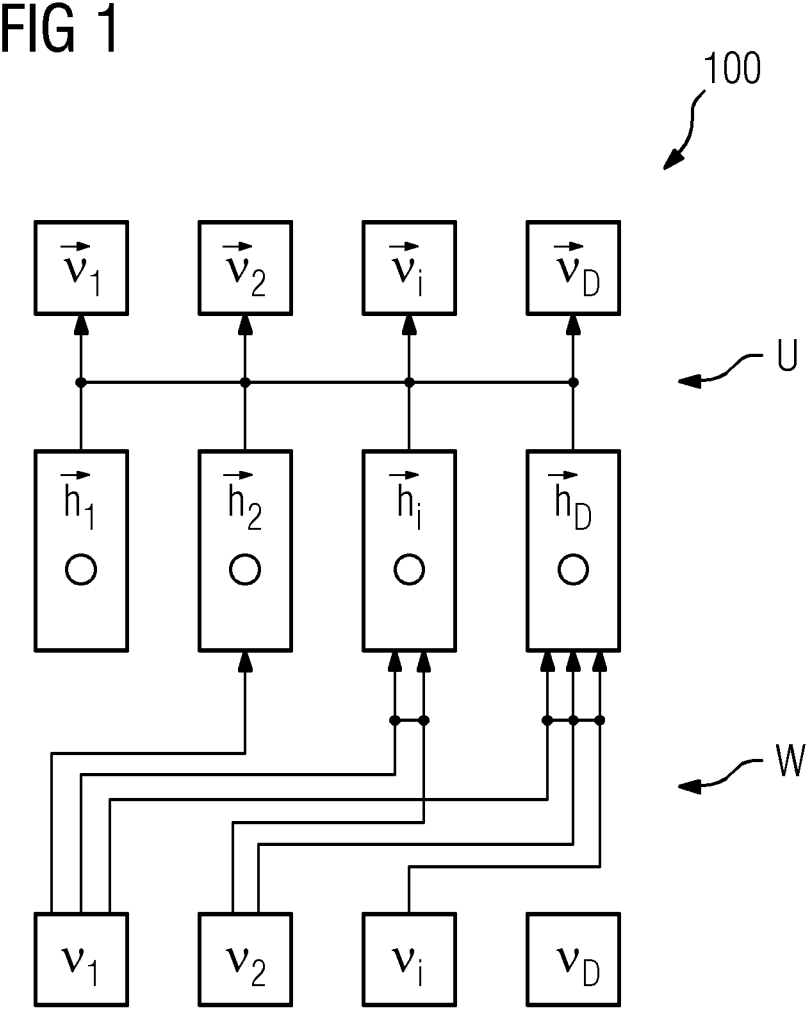

Xuerui Wang, Andrew McCallum, and Xing Wei. Topical n-grams: Phrase and topic discovery, with an application to information retrieval. In icdm, pp. 697-702. IEEE, 2007.

James Petterson, Wray Buntine, Shravan M Narayanamurthy, Tiberio S Caetano, and Alex J Smola. Word features for latent dirichlet allocation. In Advances in Neural Information Processing Systems, pp. 1921-1929, 2010.

Dat Quoc Nguyen, Richard Billingsley, Lan Du, and Mark Johnson. Improving topic models with latent feature word representations. Transactions of the Association for Computational Linguistics, 3:299-313, 2015.

Tomas Mikolov, Martin Karafiat, Lukas Burget, Jan Cernocky, and Sanjeev Khudanpur. Recurrent neural network based language model. In Eleventh Annual Conference of the International Speech Communication Association, 2010.

Kamal Nigam, Andrew Kachites McCallum, Sebastian Thrun, and Tom Mitchell. Text classification from labeled and unlabeled documents using em. Machine learning, 39(2-3):103-134, 2000.

Yin Zheng, Yu-Jin Zhang, and Hugo Larochelle. A deep and autoregressive approach for topic modeling of multimodal data. In IEEE transactions on pattern analysis and machine intelligence, pp. 1056-1069. IEEE, 2016.

Yoshua Bengio, R'ejean Ducharme, Pascal Vincent, and Christian Jauvin. A neural probabilistic language model. Journal of machine learning research, 3(Feb.):1137-1155, 2003.

Matthew Peters, Mark Neumann, Mohit Iyyer, Matt Gardner, Christopher Clark, Kenton Lee, andLuke Zettlemoyer. Deep contextualized word representations. In Proceedings of the 2018 Conference of the North American Chapter of the Association for Computational Linguistics: Human Language Technologies, vol. 1 (Long Papers), pp. 2227-2237. Association for Computational Linguistics, 2018. URL http://aclweb.org/anthology/N18-1202.

Mehran Sahami and Timothy D Heilman. A web-based kernel function for measuring the similarity of short text snippets. In Proceedings of the 15th international conference on World Wide Web, pp. 377-386. AcM, 2006.

Ruslan Salakhutdinov and Geoffrey Hinton. Replicated softmax: an undirected topic model. In Proceedings of the Advances in Neural Information Processing Systems 22 (NIPS 2009), pp. 1607-1614. NIPS, 2009.; 2009.

Hugo Larochelle and Iain Murray. The neural autoregressive distribution estimator. In Proceedings of the Fourteenth International Conference on Artificial Intelligence and Statistics, pp. 29-[37, 2011.

Hanna M Wallach. Topic modeling: beyond bag-of-words. In Proceedings of the 23rd international conference on Machine learning, pp. 977-984. ACM, 2006.

Jeffrey Pennington, Richard Socher, and Christopher D. Manning. Glove: Global vectors for word representation. In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1532-1543, 2014. URL http://aclweb.org/anthology/D/D14/D14-1162.pdf.

Stanislas Lauly, Yin Zheng, Alexandre Allauzen, and Hugo Larochelle. Document neural autoregressive distribution estimation. Journal of Machine Learning Research, 18(113): ∅ 24, 2017. URL http://jmlr.org/papers/v18/16-017.html.

Manning, C. D., and Schutze, H. 1999. Foundations of statistical natural language processing. Cambridge MA: The MIT Press.

Geoffrey E. Hinton, Simon Osindero, and Yee Whye Teh. A fast learning algorithm for deep belief nets. Neural Computation, 18:1527-1554, 2006.

Hugo Larochelle and Stanislas Lauly. A neural autoregressive topic model. In Proceedings of the Advances in Neural Information Processing Systems 25 (NIPS 2012). NIPS, 2012.

D. Blei, A. Ng, and M. Jordan. Latent Dirichlet Allocation. pp. 993-1022, 2003.; 2003.

Pankaj Gupta, Subburam Rajaram, Hinrich Schütze, and Bernt Andrassy. Deep temporal-recurrentreplicated-softmax for topical trends over time. In Proceedings of the 2018 Conference of the North American Chapter of the Association for Computational Linguistics: Human Language Technologies, vol. 1 (Long Papers), vol. 1, pp. 1079-1089, New Orleans, USA, 2018a. Association of Computational Linguistics.

Tomas Mikolov, Kai Chen, Greg Corrado, and Jeffrey Dean. Efficient estimation of word representations in vector space. In Workshop Track of the 1st International Conference on Learning Representations (ICLR 2013), 2013.

Hugo Larochelle and Yoshua Bengio. Classification using discriminative restricted boltzmann machines. In Proceedings of the 25th international conference on Machine learning, pp. 536-543. ACM, 2008.

\* cited by examiner

SYSTEM AND METHOD FOR NATURAL LANGUAGE PROCESSING

FIELD OF TECHNOLOGY

The present invention generally relates to a natural language processing system configured to receive an input sequence of input words representing a first sequence of words in a natural language of a first text and to generate an output sequence of output words representing a second sequence of words in a natural language of a second text.

BACKGROUND

Probabilistic topic models are often used to extract topics from text collections and predict the probabilities of each word in a given document belonging to each topic. Subsequently, such models learn latent document representations that can be used to perform natural language processing (NLP) tasks such as information retrieval (IR), document classification or summarization. However, such probabilistic topic models ignore the word order and represent a given context as a bag of its words, thereby disregarding semantic information. Examples for such probabilistic topic models are Latent Dirichlet Allocation (LDA) (Blei, Ng, and Jordan, 2003), Replicated Softmax (RSM) (Salakhutdinov & Hinton, 2009) and Document Neural Autoregressive Distribution Estimator (DocNADE) (Larochelle & Lauly, 2012; Zheng et al., 2016; Lauly et al., 2017).

An example of a completely different meaning of a word depending on the context and the word order is the word "bear" in the following two sentences:

Bear falls into market territory.
Market falls into bear territory.

When estimating the probability of a word in a given context such as "bear" in this example, traditional topic models do not account for the language structure since they ignore the word order within the context and are based on "bag-of-words" (BoWs) only. In this particular setting, the two sentences have the same unigram statistics, but are about different topics. On deciding which topic generated the word "bear" in the second sentence, the preceding words "market falls" make it more likely that it was generated by a topic that assigns a high probability to words related to stock market trading, where a "bear territory" is a colloquial expression in the domain. In addition, the language structure (e.g., syntax and semantics) is also ignored by traditional topic models. For instance, the word "bear" in the first sentence is a proper noun and subject while it is an object in the second. In practice, topic models also ignore functional words such as "into", which may not be appropriate in some scenarios.

Recently, Peters et al. (2018) have shown that a language model based on deep contextualized Long Short-Term Memory (LSTM-LM) is able to capture different language concepts in a layer-wise fashion, e.g., the lowest layer captures language syntax and the topmost layer captures semantics. However, in LSTM-LMs the probability of a word is a function of its sentence only and word occurrences are modelled in a fine granularity. Consequently, LSTM-LMs do not capture semantics at a document level.

Similarly, while bi-gram Latent Dirichlet Allocation (LDA) based topic models (Wallach, 2006; Wang et al., 2007) and n-gram based topic learning (Lauly et al., 2017) can capture word order in short contexts, they are unable to capture long term dependencies and language concepts. In contrast, Document Neural Autoregressive Distribution Estimator (DocNADE) (Larochelle & Lauly, 2012) learns word occurrences across documents and provides a coarse granularity in the sense that the topic assigned to a given word occurrence equally depends on all the other words appearing in the same document. However, since it is based on the Bag of Words (BoW) assumption all language structure is ignored. In language modeling, Mikolov et al. (2010) have shown that recurrent neural networks result in a significant reduction of perplexity over standard n-gram models.

Furthermore, there is a challenge in settings with short texts and few documents. Related work such as Sahami & Heilman (2006) employed web search results to improve the information in short texts and Petterson et al. (2010) introduced word similarity via thesauri and dictionaries into LDA. Das et al. (2015) and Nguyen et al. (2015) integrated word embeddings into LDA and Dirichlet Multinomial Mixture (DMM) (Nigam et al., 2000) models. However, these works are based on LDA-based models without considering language structure, e.g. word order.

Generative models are based on estimating the probability distribution of multidimensional data, implicitly requiring modeling complex dependencies. Restricted Boltzmann Machine (RBM) (Hinton et al., 2006) and its variants (Larochelle and Bengio, 2008) are probabilistic undirected models of binary data. Replicated Softmax Model (RSM) (Salakhutdinov and Hinton, 2009) and its variants (Gupta et al., 2018b) are generalization of the RBM, that are used to model word counts. However, estimating the complex probability distribution of the underlying high-dimensional observations is intractable. To address this challenge, NADE (Larochelle & Murray, 2011) decomposes the joint distribution of binary observations into autoregressive conditional distributions, each modeled using a feed-forward network. Unlike for RBM/RSM, this leads to tractable gradients of the data negative log-likelihood.

As an extension of the Neural Autoregressive Topic Model (NADE) and RSM, the Document Neural Autoregressive Topic Model (DocNADE) (Larochelle & Lauly, 2012; Zheng, Zhang and Larochelle, 2016) models collections of documents as orderless sets of words (BoW approach), thereby disregarding any language structure. It is a probabilistic graphical model that learns topics over sequences of words corresponding to a language model (Manning and Schütz, 1999; Bengio et al., 2003) that can be interpreted as a neural network with several parallel hidden layers. In other words, it is trained to learn word representations reflecting the underlying topics of the documents only, ignoring syntactical and semantic features as those encoded in word embeddings (Bengio et al., 2003; Mikolov et al., 2013; Pennington et al., 2014; Peters et al., 2018).

While this is a powerful approach for incorporating contextual information in particular for long texts and corpora with many documents, learning contextual information remains challenging in topic models with short texts and few documents, due to a) limited word co-occurrences or little context and b) significant word non-overlap in such short texts.

SUMMARY

It is therefore an object of the present invention to improve topic modelling for short-text and long-text documents, especially for providing a better estimation of the probability of a word in a given context of a text corpus.

According to a first aspect, the invention provides a language processing system configured for receiving an input sequence $c_i$ of input words $(v_1, v_2, \ldots v_N)$ representing a first sequence of words in a natural language of a first text and generating an output sequence of output words $(\hat{v}_1, \hat{v}_2, \ldots \hat{v}_N)$ representing a second sequence of words in a natural language of a second text and modeled by a multinominal topic model, wherein the multinominal topic model is extended by an incorporation of full contextual information around a word $v_i$, wherein both previous $v_{<i}$ and $v_{>i}$ following words around each word $v_i$ are captured by using a bi-directional language modelling and a feed-forward fashion, wherein position dependent forward hidden layers $\vec{h}_i$ and backward hidden layers $\overline{h}_i$ for each word $v_i$ are computed.

In a preferred embodiment, the multinominal topic model is a neural autoregressive topic model (DocNADE) and the extended multinominal topic model is an iDocNADE model.

Preferably, the forward hidden layers $\vec{h}_i$ and backward hidden layers $\overline{h}_i$ for each word $v_i$ are computed as:

$$\vec{h}_i(v_{<i}) = g(D\vec{c} + \Sigma_{k<i} W_{:,v_k})$$

$$\overline{h}_i(v_{>i}) = g(D\overline{c} + \Sigma_{k>i} W_{:,v_k})$$

where $\vec{c} \in \mathbb{R}^H$ and $\overline{c} \in \mathbb{R}^H$ are bias parameters in forward and backwards passes and H is the number of hidden topics).

Advantageously, the log-likelihood $\mathcal{L}^{DN}(v)$ for a document v is computed by using forward and backward language models as:

$$\log p(v) = \tfrac{1}{2} \Sigma_{i=1}^D \log p(v_i | v_{<i}) + \log p(v_i | v_{>i})$$

In an advantageous embodiment, the iDocNADE model is extended by the incorporation of word embeddings for generating an iDocNADE² model.

In a further preferred embodiment, the word embeddings is a word embedding aggregation at each representation $\Sigma_{k<i} E_{:,v_k}$ with a pre-trained embedding matrix $E \in \mathbb{R}^{H \times K}$.

Preferably, the position dependent forward $\vec{h}_{i,e}(v_{<i})$ and backward $\overline{h}_{i,e}(v_{>i})$, hidden layers for each word $v_i$ depend now on E as:

$$\vec{h}_{i,e}(v_{<i}) = g(D\vec{c} + \Sigma_{k<i} W_{:,v_k} + \Sigma_{k<i} E_{:,v_k})$$

$$\overline{h}_{i,e}(v_{>i}) = g(D\overline{c} + \Sigma_{k>i} W_{:,v_k} + \Sigma_{k>i} E_{:,v_k})$$

and the forward and backward autoregressive conditionals are computed via the hidden vectors $\vec{h}_{i,e}(v_{<i})$ and $\overline{h}_{i,e}(v_{>i})$.

According to a second aspect, the invention provides a method for processing natural language in a neural system, comprising receiving an input sequence $c_i$ of input words $(v_1, v_2, \ldots v_N)$ representing a first sequence of words in a natural language of a first text and generating an output sequence of output words $(\hat{v}_1, \hat{v}_2, \ldots \hat{v}_N)$ representing a second sequence of words in a natural language of a second text and modeled by a multinominal topic model, comprising the steps:

extending the multinominal topic model by an incorporation of full contextual information around a word $v_i$, capturing both preceding words $v_{<i}$ and following words $v_{>i}$ around each word $v_i$ using a bi-directional language modelling and a feed-forward fashion computing position dependent forward hidden layers $\vec{h}_i$ and backward hidden layers $\overline{h}_i$ for each word $v_i$.

In a preferred embodiment, the multinominal topic model is a document neural autoregressive topic model, Doc-NADE, and the extended multinominal topic model is a document informed autoregressive topic model, iDoc-NADE.

Preferably, the forward hidden layers $\vec{h}_i$ and backward hidden $\overline{h}_i$ for each word $v_i$ are computed as:

$$\vec{h}_i(v_{<i}) = g(D\vec{c} + \Sigma_{k<i} W_{:,v_k})$$

$$\overline{h}_i(v_{>i}) = g(D\overline{c} + \Sigma_{k>i} W_{:,v_k})$$

where $\vec{c} \in \mathbb{R}^H$ and $\overline{c} \in \mathbb{R}^H$ are bias parameters in forward and backwards passes and H is the number of hidden topics).

Advantageously, the log-likelihood $\mathcal{L}^{DN}(v)$ for a document v is computed by using forward and backward language models as:

$$\log p(v) = \tfrac{1}{2} \Sigma_{i=1}^D \log p(v_i | v_{<i}) + \log p(v_i | v_{>i})$$

Preferably, the iDocNADE model is extended by the incorporation of word embeddings for generating an iDoc-NADE² model.

In a further preferred embodiment, the word embeddings is a word embedding aggregation at each representation $\Sigma_{k<i} E_{:,v_k}$ with a pre-trained embedding matrix $E \in \mathbb{R}^{H \times K}$.

Advantageously, the position dependent forward hidden layers $\vec{h}_{i,e}(v_{<i})$ and backward hidden layers $\overline{h}_{i,e}(v_{>i})$ for each word $v_i$ depend now on E as:

$$\vec{h}_{i,e}(v_{<i}) = g(D\vec{c} + \Sigma_{k<i} W_{:,v_k} + \Sigma_{k<i} E_{:,v_k})$$

$$\overline{h}_{i,e}(v_{>i}) = g(D\overline{c} + \Sigma_{k>i} W_{:,v_k} + \Sigma_{k>i} E_{:,v_k})$$

and the forward and backward autoregressive conditionals are computed via the hidden vectors $\vec{h}_{i,e}(v_{<i})$ and $\overline{h}_{i,e}(v_{<i})$.

According to a third aspect, the invention provides a computer program product comprising executable program code configured to, when executed, perform the method according to the second aspect.

BRIEF DESCRIPTION

Figure 2:
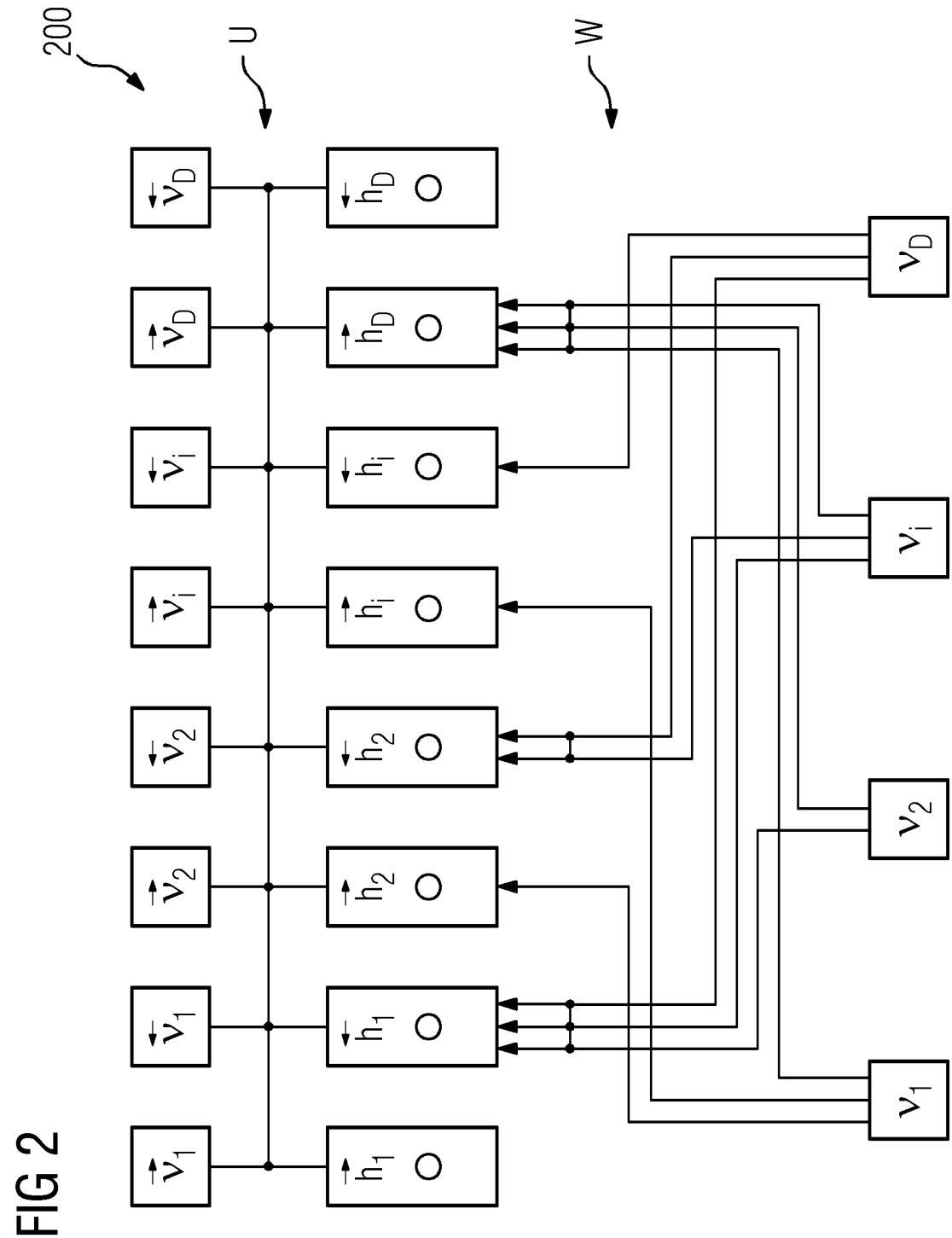
Figure 3:
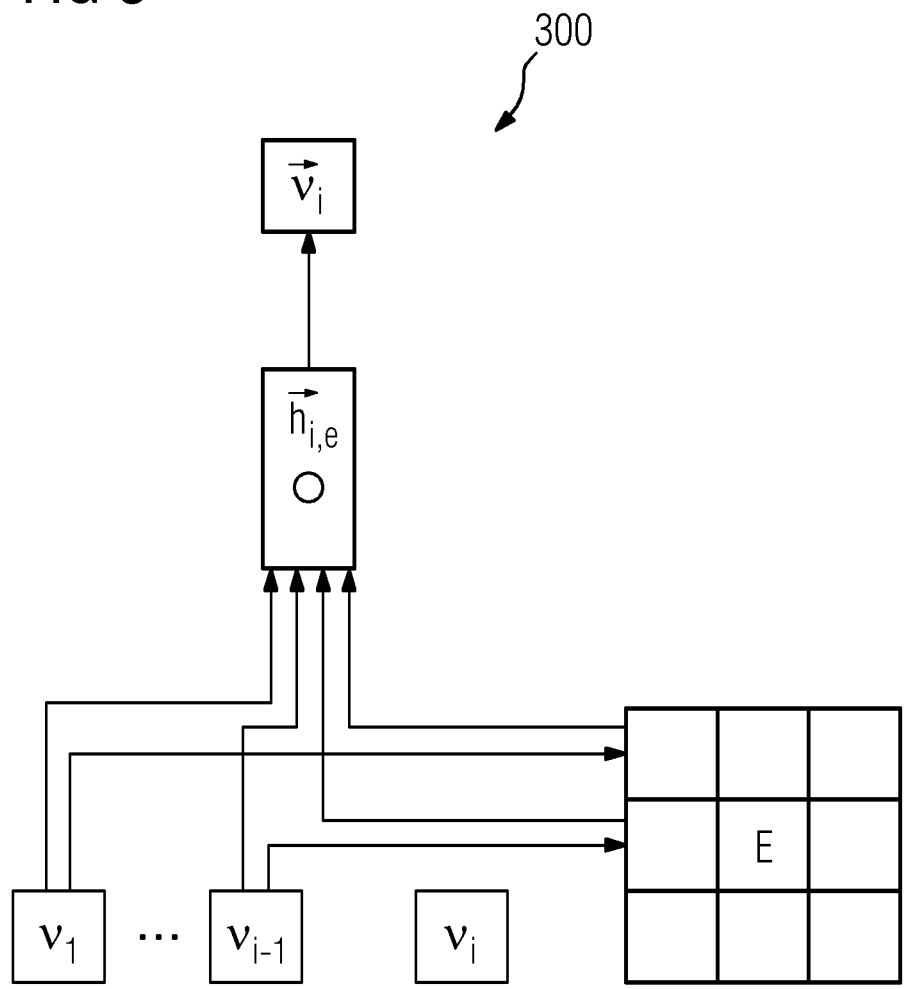
Figure 4:
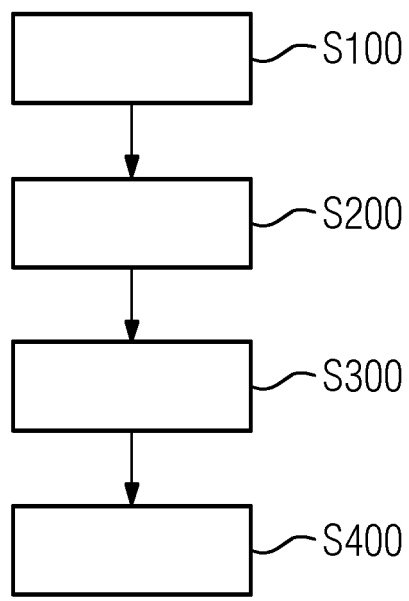
Figure 5:
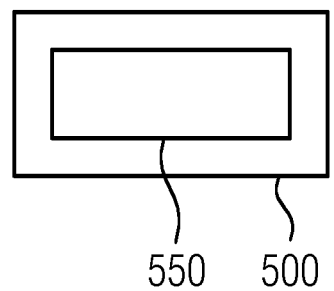

Additional features, aspects and advantages of the invention or of its embodiments will become apparent on reading the detailed description in conjunction with the following figures:

FIG. 1 provides a schematic overview of a DocNADE model;

FIG. 2 provides a schematic overview of an iDocNADE model;

FIG. 3 provides a schematic overview of a DocNADE² model;

FIG. 4 provides a schematic flow diagram illustrating an embodiment of a method according to the second aspect of the present invention; and FIG. 5 schematically illustrates a computer program product according to an embodiment of the third aspect of the invention.

In the following description, for purposes of explanation and not limitation, specific details are set forth in order to provide a thorough understanding of the present invention. It will be apparent to one skilled in the art that the present invention may be practiced in other implementations that depart from these specific details.

DETAILED DESCRIPTION

In FIG. 1 a DocNADE model 100 is illustrated according to the state of the art. DocNADE 100 is a generative neural autoregressive topic model to account for word counts, inspired by Replicated Softmax (RSM) and Neural Autoregressive Topic Model (NADE). A document is represented by transforming its Bag of Words (BoWs) into a sequence $v=[v_1, \ldots, v_D]$ of size D, where each element $v_i \in \{1,2,\ldots,K\}$ corresponds to a multinominal observation (representing a word from a vocabulary of size K). Thus, $v_i$ is the index in the vocabulary of the ith word of the document v. DocNADE 100 models the joint distribution conditional p(v) of all words $v_i$ by decomposing it as $p(v)=\Pi_{i=1}^{D} p(v_i|v_{<i})$, where each autoregressive conditional $p(v_i|v_{<i})$ for the word observation $v_i$ is computed using the preceding observation $v_{<i} \in \{v_i, \ldots, v_{i-1}\}$ in a feed-forward neural network for $i \in \{1, \ldots, D\}$, with hidden layers $\vec{h}_i$ $$\vec{h}_i(V_{<i}) = g\left(e + \sum_{k<i} W_{:,v_k}\right) \quad (1)$$

and $$p(v_i = w \mid v_{<i}) = \frac{\exp\left(b_w + U_{w,:}\vec{h}_i^{DN}(v_{<i})\right)}{\sum_{w'} \exp\left(b_{w'} + U_{w',:}\vec{h}_i^{DN}(v_{<i})\right)} \quad (2)$$

where g(x) is an activation function, $U \in \mathbb{R}^{K \times H}$ is a weight matrix connecting hidden units to output, $e \in \mathbb{R}^H$ and $b \in \mathbb{R}^K$ are bias vectors, $W \in \mathbb{R}^{H \times K}$ is a word representation matrix in which a column $W_{:,v_i}$ is a vector representation of the word $v_i$ in the vocabulary, and H is the number of hidden units (topics). The log-likelihood of any document v of any arbitrary length is given by:

$$\mathcal{L}^{DocNADE}(v) = \Sigma_{i=1}^{D} \log p(v_i|v_{<i}) \quad (3)$$

The past word observations $v_{<i}$ are orderless due to BoWs and may not correspond to the words preceding the ith word in the document itself.

To predict the word $v_i$, each hidden layer $h_i$ takes as input the sequences of preceding words $v_{<i}$. However, it does not take into account the following words $v_{>i}$ in the sequence.

In FIG. 2 an iDocNADE model 200 according to the present invention is illustrated. In the iDocNADE model 200 full contextual information around words in a document v are incorporated in a neural autoregressive topic model to boost the likelihood of each word. This enables better informed document representations which can be quantified via generalization (perplexity, interpretability, topic, coherence) and applicability (document retrieval and classification. The topic model according to the present invention is named "Document informed Neural Autoregressive Distribution Estimator (iDocNADE). Context information around words helps in determining their actual meaning. However, there is often a lack of context in short-text documents such as headlines, tweets, etc. or only a few documents are available. In case of a lack of context it is difficult to learn good representations as incoherent topics are generated. In order to solve this problem, external and/or additional information is used such as word embeddings which encode semantic and syntactic relatedness in words in a vector space, according to the present invention. In FIG. 2 the incorporation of full contextual information around a word $v_i$ in a document by preceding and following words is illustrated.

iDocNADE 200 accounts for the full context information as capturing both previous $v_{<i}$ and $v_{>i}$ following words around each word $v_i$. Therefore, the log-likelihood $\mathcal{L}^{DN}(v)$ for a document v is computed by using forward and backward language models as:

$$\log p(v) = \frac{1}{2}\sum_{i=1}^{D} \underbrace{\log p(v_i \mid v_{<i})}_{\text{forward}} + \underbrace{\log p(v_i \mid v_{>i})}_{\text{backward}} \quad (4)$$

i.e., the mean of the forward ($\vec{\mathcal{L}}$) and backward ($\overleftarrow{\mathcal{L}}$) log-likelihoods. This is achieved in a bi-directional language modeling and feed-forward fashion by computing position dependent forward hidden layers $\vec{h}_i$ and backward hidden layers $\overleftarrow{h}_i$ for each word $v_i$, as:

$$\vec{h}_i(v_{<i}) = g(D\vec{c} + \Sigma_{k<i} W_{:,v_k}) \quad (5)$$

$$\overleftarrow{h}_i(v_{>i}) = g(D\overleftarrow{c} + \Sigma_{k>i} W_{:,v_k}) \quad (6)$$

where $\vec{c} \in \mathbb{R}^H$ and $\overleftarrow{c} \in \mathbb{R}^H$ are bias parameters in forward and backwards passes, respectively. H is the number of hidden units (topics).

Two autoregressive conditionals are computed for each ith word using the forward and backward hidden vectors, $$p(v_i = w \mid v_{<i}) = \frac{\exp\left(\vec{b}_w + U_{w,:}\vec{h}_i^{DN}(v_{<i})\right)}{\sum_{w'} \exp\left(\vec{b}_{w'} + U_{w',:}\vec{h}_i^{DN}(v_{<i})\right)} \quad (7)$$

$$p(v_i = w \mid v_{>i}) = \frac{\exp\left(\overleftarrow{b}_w + U_{w,:}\overleftarrow{h}_i^{DN}(v_{>i})\right)}{\sum_{w'} \exp\left(\overleftarrow{b}_{w'} + U_{w',:}\overleftarrow{h}_i^{DN}(v_{>i})\right)} \quad (8)$$

For $i \in [1, \ldots, D]$ where $\vec{b} \in \mathbb{R}^K$ and $\overleftarrow{b} \in \mathbb{R}^K$ are biases in forward and backward passes, respectively. The parameters W and U are shared between the two networks.

In FIG. 3 a further extension of DocNADE as DocNADE² 300 is illustrated. For DocNADE² 300 complementary information via word embeddings, along with the standard short word representations are incorporated into DocNADE-like models. The resulting two DocNADE variants are named as with Embeddings "Document Neural Autoregressive Distribution Estimator" (DocNADE²) and "Document Informed Neural Autoregressive Distribution Estimator with Embeddings" (iDocNADE²).

By introducing additional semantic information for each word into DocNADE-like models via its pre-trained embedding vector, better textual representations and semantically more coherent topic distributions can be enabled, in particular for short texts. DocNADE 100 is extended with word embedding aggregation at each representation, i.e., $\Sigma_{k<i} E_{:,v_k}$ This mechanism utilizes prior knowledge encoded in a pre-trained embedding matrix $E \in \mathbb{R}^{H \times K}$ when learning task-specific matrices W and latent representations in DocNADE-like models. The position dependent forward hidden layers $\vec{h}_{i,e}(v_{<i})$ and backward hidden layers $\overleftarrow{h}_{i,e}(v_{>i})$ hidden layers for each word $v_i$, depend now on E as:

$$\vec{h}_{i,e}(v_{<i}) = g(D\vec{c} + \Sigma_{k<i} W_{:,v_k} + \Sigma_{k<i} E_{:,v_k}) \quad (9)$$

$$\overleftarrow{h}_{i,e}(v_{<i}) = g(D\overleftarrow{c} + \Sigma_{k>i} W_{:,v_k} + \Sigma_{k>i} E_{:,v_k}) \quad (10)$$

The forward and backward autoregressive conditionals are computed via hidden vectors $\vec{h}_{i,e}(v_{<i})$ and $\overline{h}_{i,e}(v_{>i})$, respectively.

Furthermore, DocNADE 100 can be extended to a deep, multiple hidden layer architecture by adding new hidden layers as in a regular deep feed-forward neural network, allowing for improved performance. In this deep version of DocNADE variants, the first hidden layers are computed in an analogous fashion to iDocNADE.

Similar to DocNADE 100, the conditionals $p(v_i=w|v_{<1})$ and $p(v_i=w|v_{>1})$ in DocNADE² 300, iDocNADE 200 or iDocNADE² are computed by a neural network for each word $v_i$, allowing efficient learning of informed representations $\vec{h}_i$ and $\overline{h}_i$ (or $\vec{h}_{i,e}(v_{<i})$ and $\overline{h}_{i,e}(v_{>i})$), as it consists simply of a linear transformation followed by a non-linearity. The weight matrix W or prior embedding matrix E is the same across all conditionals.

To compute the likelihood of a document, the autoregressive conditionals $p(v_i=w|v_{<1})$ and $p(v_i=w|v_{>1})$ are computed for each word $v_i$. A probabilistic tree may be used for the computation of the conditionals. All words in the documents are randomly assigned to a different leaf in a binary tree and the probability of a word is computed as the probability of reaching its associated leaf from the root. Each left/right transition probability is modeled using a binary logistic regressor with the hidden layer $\vec{h}_i$ or $\overline{h}_i$ ($\vec{h}_{i,e}(v_{<i})$ or $\overline{h}_{i,e}(v_{>i})$) as its input. In the binary tree, the probability of a given word is computed by multiplying each of the left/right transition probabilities along the tree path.

Algorithm 1 shows the computation of log p(v) using iDocNADE (or iDocNADE²) structure, where the autoregressive conditionals (lines 14 and 15) for each word $v_i$ are obtained from the forward and backward networks and modeled into a binary word tree, where $\pi(v_i)$ denotes the sequence of binary left/right choices at the internal nodes along the tree path and $l(v_i)$, the sequence of tree nodes on that tree path. For instance, $l(v_i)_1$ will always be the root of the binary tree and $\pi(v_i)_1$ will be 0 if the word leaf $v_i$ is in the left subtree or 1 otherwise. Therefore, each of the forward and backward conditionals are computed as:

$$p(v_i=w|v_{<i})=\Pi_{m=1}^{|\pi(v_i)|}p(\pi(v_i)_m|v_{<i})$$

$$p(v_i=w|v_{>i})=\Pi_{m=1}^{|\pi(v_i)|}p(\pi(v_i)_m|v_{>i})$$

$$p(\pi(v_i)_m|v_{<i})=g(\vec{b}_{l(v_i)}+U_{l(v_i)m,:}\vec{h}(v_{<i})),$$

$$p(\pi(v_i)_m|v_{>i})=g(\overline{b}_{l(v_i)}+U_{l(v_i)m,:}\overline{h}(v_{>i})),$$

where $U \in \mathbb{R}^{T \times H}$ is the matrix of logistic regressions weights, T is the number of internal nodes in the binary tree, and $\vec{b}$ and $\overline{b}$ are bias vectors.

Each of the forward and backward conditionals $p(v_i=w|v_{<1})$ and $p(v_i=w|v_{>1})$ requires the computation of its own hidden layers layer $\vec{h}_i$ and $\overline{h}_i$. With H being the size of each hidden layer and D the number of words in v, computing a single hidden layer requires O(HD), and since there are D hidden layers to compute, a naïve approach for computing all hidden layers would be in O(D²H). However, since the weights in the matrix W are tied, the linear activations $\vec{a}$ and $\overline{a}$ (algorithm 1) can be re-used in every hidden layer and computational complexity reduces to O(HD).

| | |
|---|---|
| Input: | A training vector v |
| Input: | Word embedding matrix E |
| Parameters: | $\{\vec{b}, \overline{b}, \vec{c}, \overline{c}, W, U\}$ |
| Output: | log p(v) |
| 1. | $\vec{a} \leftarrow \vec{c}$ |
| 2. | if iDocNADE then |
| 3. | $\vec{a} \leftarrow \vec{c} + \Sigma_{i>1} W_{:,v_i}$ |
| 4. | if iDocNADE² then |
| 5. | $\vec{a} \leftarrow \vec{c} + \Sigma_{i>1} W_{:,v_i} + \Sigma_{i>1} E_{:,v_i}$ |
| 6. | q(v) = 1 |
| 7. | for i from 1 to D do |
| 8. | $\vec{h}_i \leftarrow g(\vec{a})$ |
| 9. | $\overline{h}_i \leftarrow g(\overline{a})$ |
| 10. | if tree-softmax then |
| 11. | $p(v_i|v_{<1}) = 1$ |
| 12. | $p(v_i|v_{>1}) = 1$ |
| 13. | for m from 1 to $|\pi(v_i)|$ do |
| 14. | $p(v_i|v_{<1}) \leftarrow p(v_i|v_{<i})p(\pi(v_i)_m|v_{<i})$ |
| 15. | $p(v_i|v_{>1}) \leftarrow p(v_i|v_{>i})p(\pi(v_i)_m|v_{>i})$ |
| 16. | if full-softmax then |
| 17. | compute $p(v_i|v_{<i})$ using equation 7 |
| 18. | compute $p(v_i|v_{>i})$ using equation 8 |
| 19. | $q(v) \leftarrow q(v)p(v_i|v_{<i})p(v_i|v_{>i})$ |
| 20. | if iDocNADE then |
| 21. | $\vec{a} \leftarrow \vec{a} + W_{:,v_i}$ |
| 22. | $\overline{a} \leftarrow \overline{a} - W_{:,v_i}$ |
| 23. | if iDocNADE² then |
| 24. | $\vec{a} \leftarrow \vec{a} + W_{:,v_i} + E_{:,v_i}$ |
| 25. | $\overline{a} \leftarrow \overline{a} W_{:,v_i} - E_{:,v_i}$ |
| 26. | $\log p(v) \leftarrow \frac{1}{2} \log q(v)$ |

The modeling approaches according to the present invention have been applied to 8 short-text and 6 long-text datasets from different domains. With the learned representations, a gain of 8.4% in perplexity, 8.8% in precision at retrieval fraction and 5.2% for text categorization, compared to the DocNADE model could be achieved.

Distributional word representations (i.e. word embeddings) have shown to capture both the semantic and syntactic relatedness in words and demonstrated impressive performance in natural language processing (NLP) tasks. For example, the two short text fragments: "Goldman shares drop sharply downgrade" and "Falling market homes weaken economy" have a common embedding space as they relate to economy. However, traditional topic models are not able to infer relatedness between word pairs across the sentences such as (economy, shares) due to lack of word-overlap between sentences.

In FIG. 4 the processing steps of the method according to the present invention are illustrated. In step S100, the multinominal topic model is extended by an incorporation of full contextual information around a word $v_i$, in step S200 both previous $v_{<i}$ and $v_{>i}$ following words around each word $v_i$ are captured, in step S300 a bi-directional language modelling and a feed-forward fashion is used, and in step S400 position dependent forward hidden layers $\vec{h}_i$ and backward hidden layers $\overline{h}_i$ for each word $v_i$ are computed.

FIG. 5 schematically illustrates a computer program product 500 comprising executable program code 550 configured to, when executed, perform the method according to the second aspect of the present invention.

Therefore, according to the present invention word embeddings as fixed prior are incorporated in neural topic models in order to introduce complementary information. The proposed neural architectures learn task specific word vectors in association with static embedding priors leading to better text representation for topic extraction, information retrieval and classification, especially in document management. Therefore, common natural language processing tasks such as document modeling, generalization and applications in document information retrieval, document representations, learning and topic modeling can be improved by the present invention. Furthermore, industrial documents, such as contract documents, service reports, can be analyzed and recommendations regarding replacement, amendments, inspection, repair, etc. can be provided. The encoded semantics via distributed document representations help in analyzing contract document so that for example similarities in contract documents can be found or topic extraction and text retrieval is achieved much easier.

Furthermore, the presented invention can be used for artificial and deep learning frameworks and allow an expert of technician to interact and qualitatively analyze the machine learning system. The work flow and system output can be optimized and improved.

The invention claimed is:

1. A natural language processing system, comprising:
a processor,
wherein the processor is configured to receive an input sequence $c_i$ of input words representing a first sequence of words in a natural language of a first text and generate an output sequence of output words representing a second sequence of words in a natural language of a second text and modeled by a multinominal topic model, wherein the multinominal topic model is extended by an incorporation of full contextual information around each word $v_i$, wherein both preceding words $v_{<i}$ and following words $v_{>i}$ around each word $v_i$ are captured by using a bi-directional language modelling and a feed-forward fashion, wherein position dependent forward hidden layers $\vec{h}_i$ and backward hidden layers $\overleftarrow{h}_i$ for each word $v_i$ are computed, wherein the multinominal topic model is a document neural autoregressive topic model, DocNADE, and the extended multinominal topic model is an informed document neural autoregressive topic model, iDocNADE.

2. The natural language processing system of claim 1, wherein the forward hidden layers $\vec{h}_i$ and backward hidden layers $\overleftarrow{h}_i$ for each word $v_i$ are computed as:

$$\vec{h}_i(v_{<i})=g(D\vec{c}+\Sigma_{k<i}W_{:,v_k})$$

$$\overleftarrow{h}_i(v_{>i})=g(D\overleftarrow{c}+\Sigma_{k>i}W_{:,v_k})$$

where $\vec{c} \in \mathbb{R}^H$ and $\overleftarrow{c} \in \mathbb{R}^H$ are bias parameters in forward and backwards passes and H is the number of hidden topics.

3. The natural language processing system of claim 1, wherein a log-likelihood $\mathcal{L}^{DN}(v)$ for a document v is computed by using forward and backward language models as:

$$\log p(v) = \tfrac{1}{2}\Sigma_{i=1}^{D} \log p(v_i|v_{<i}) + \log p(v_i|v_{>i}).$$

4. The natural language processing system of claim 1, wherein the iDocNADE model is extended by the incorporation of word embeddings for generating an iDocNADE$^2$ model.

5. The natural language processing system of claim 4, wherein the word embeddings is a word embedding aggregation at each representation $\Sigma_{k<i}E_{:,v_k}$ with a pre-trained embedding matrix $E \in \mathbb{R}^{H \times K}$.

6. The natural language processing system of claim 5, wherein the position dependent forward hidden layers $\vec{h}_{i,e}(v_{<i})$ and backward hidden layers $\overleftarrow{h}_{i,e}(v_{>i})$ hidden layers for each word $v_i$, depend now on E as:

$$\vec{h}_{i,e}(v_{<i})=g(D\vec{c}+\Sigma_{k<i}W_{:,v_k}+\Sigma_{k<i}E_{:,v_k})$$

$$\overleftarrow{h}_{i,e}(v_{<i})=g(D\overleftarrow{c}+\Sigma_{k>i}W_{:,v_k}+\Sigma_{k>i}E_{:,v_k})$$

and the forward and backward autoregressive conditionals are computed via hidden vectors $\vec{h}_{i,e}(v_{<i})$ and $\overleftarrow{h}_{i,e}(v_{>i})$.

7. A computer-implemented method for processing natural language, comprising:
receiving an input sequence $c_i$ of input words representing a first sequence of words in a natural language of a first text and generating an output sequence of output words representing a second sequence of words in a natural language of a second text and modeled by a multinominal topic model,
extending the multinominal topic model by an incorporation of full contextual information around each word $v_i$;
capturing both preceding words $v_{<i}$ and following words $v_{>i}$ around each word $v_i$;
using a bi-directional language modelling and a feed-forward fashion; and
computing position dependent forward hidden layers $\vec{h}_i$ and backward hidden layers $\overleftarrow{h}_i$ for each word $v_i$;
wherein the multinominal topic model is a document neural autoregressive topic model, DocNADE, and the extended multinominal topic model is an informed document neural autoregressive topic model, iDocNADE.

8. The method of claim 7, wherein the forward hidden layers $\vec{h}_i$ and backward hidden layers $\overleftarrow{h}_i$ for each word $v_i$ are computed as:

$$\vec{h}_i(v_{<i})=g(D\vec{c}+\Sigma_{k<i}W_{:,v_k})$$

$$\overleftarrow{h}_i(v_{>i})=g(D\overleftarrow{c}+\Sigma_{k>i}W_{:,v_k})$$

where $\vec{c} \in \mathbb{R}^H$ and $\overleftarrow{c} \in \mathbb{R}^H$ are bias parameters in forward and backwards passes and H is the number of hidden topics.

9. The method of claim 7, wherein the log-likelihood $\mathcal{L}^{DN}(v)$ for a document v is computed by using forward and backward language models as:

$$\log p(v) = \frac{1}{2}\sum_{i=1}^{D} \log p(v_i \mid v_{<i}) + \log p(v_i \mid v_{>i}).$$

10. The method of claim 7, wherein the iDocNADE model is extended by the incorporation of word embeddings for generating an iDocNADE$^2$ model.

11. The method of claim 10, wherein the word embeddings is a word embedding aggregation at each representation $\Sigma_{k<i}E_{:,v_k}$ with a pre-trained embedding matrix $E \in \mathbb{R}^{H \times K}$.

12. The method of claim 11, wherein the position dependent forward hidden layers $\vec{h}_{i,e}(v_{<i})$ and backward hidden layers $\overleftarrow{h}_{i,e}(v_{>i})$ hidden layers for each word $v_i$, depend now on E as:

$$\vec{h}_{i,e}(v_{<i})=g(D\vec{c}+\Sigma_{k<i}W_{:,v_k}+\Sigma_{k<i}E_{:,v_k})$$

$$\overleftarrow{h}_{i,e}(v_{<i})=g(D\overleftarrow{c}+\Sigma_{k>i}W_{:,v_k}+\Sigma_{k>i}E_{:,v_k})$$

and the forward and backward autoregressive conditionals are computed via hidden vectors $\vec{h}_{i,e}(v_{<i})$ and $\overline{h}_{i,e}(v_{>i})$.

13. A non-transitory computer-readable data storage medium comprising executable program code configured to, when executed, perform a method for processing natural language, the method comprising:
    receiving an input sequence $c_i$ of input words representing a first sequence of words in a natural language of a first text and generating an output sequence of output words representing a second sequence of words in a natural language of a second text and modeled by a multinominal topic model,
    extending the multinominal topic model by an incorporation of full contextual information around each word $v_i$;
    capturing both preceding words $v_{<i}$ and following words $v_{>i}$ around each word $v_i$;
    using a bi-directional language modelling and a feed-forward fashion; and
    computing position dependent forward hidden layers $\vec{h}_i$ and backward hidden layers $\overline{h}_i$ for each word $v_i$;
    wherein the multinominal topic model is a document neural autoregressive topic model, DocNADE, and the extended multinominal topic model is an informed document neural autoregressive topic model, iDocNADE.

14. The non-transitory computer-readable data storage medium of claim 13, wherein the forward hidden layers $\vec{h}_i$ and backward hidden layers $\overline{h}_i$ for each word $v_i$ are computed as:

$$\vec{h}_i(v_{<i}) = g(D\vec{c} + \Sigma_{k<i} W_{:,v_k})$$

$$\overline{h}_i(v_{>i}) = g(D\overline{c} + \Sigma_{k>i} W_{:,v_k})$$

where $\vec{c} \in \mathbb{R}^H$ and $\overline{c} \in \mathbb{R}^H$ are bias parameters in forward and backwards passes and H is the number of hidden topics.

15. The non-transitory computer-readable data storage medium of claim 13, wherein the log-likelihood $\mathcal{L}^{DN}(v)$ for a document v is computed by using forward and backward language models as:

$$\log p(v) = \frac{1}{2} \sum_{i=1}^{D} \log p(v_i | v_{<i}) + \log p(v_i | v_{>i}).$$

16. The non-transitory computer-readable data storage medium of claim 13, wherein the iDocNADE model is extended by the incorporation of word embeddings for generating an iDocNADE$^2$ model.

17. The non-transitory computer-readable data storage medium of claim 16, wherein the word embeddings is a word embedding aggregation at each representation $\Sigma_{k<i} E_{:,v_k}$ with a pre-trained embedding matrix $E \in \mathbb{R}^{H \times K}$.

18. The non-transitory computer-readable data storage medium of claim 17, wherein the position dependent forward hidden layers $\vec{h}_{i,e}(v_{<i})$ and backward hidden layers $\overline{h}_{i,e}(v_{>i})$ hidden layers for each word $v_i$, depend now on E as:

$$\vec{h}_{i,e}(v_{<i}) = g(D\vec{c} + \Sigma_{k<i} W_{:,v_k} + \Sigma_{k<i} E_{:,v_k})$$

$$\overline{h}_{i,e}(v_{<i}) = g(D\overline{c} + \Sigma_{k>i} W_{:,v_k} + \Sigma_{k>i} E_{:,v_k})$$

and the forward and backward autoregressive conditionals are computed via hidden vectors $\vec{h}_{i,e}(v_{<i})$ and $\overline{h}_{i,e}(v_{>i})$.

* * * * *